United States Patent [19]

Zayhowski

[11] Patent Number: 5,386,427
[45] Date of Patent: Jan. 31, 1995

[54] THERMALLY CONTROLLED LENSES FOR LASERS

[75] Inventor: John J. Zayhowski, Pepperell, Mass.

[73] Assignee: Massachusetts Institute of Technology, Cambridge, Mass.

[21] Appl. No.: 195,361

[22] Filed: Feb. 10, 1994

[51] Int. Cl.$^6$ ............................................. H01S 3/04
[52] U.S. Cl. ........................................ 372/34; 372/36; 372/101; 372/29; 372/108; 372/99
[58] Field of Search .................. 372/34, 36, 29, 99, 372/108, 101, 92, 105

[56] References Cited

U.S. PATENT DOCUMENTS

| | | | |
|---|---|---|---|
| 3,699,472 | 10/1972 | Young | 372/29 |
| 4,848,881 | 7/1989 | Kahan et al. | 372/105 |
| 4,872,743 | 10/1989 | Baba et al. | 350/353 |
| 5,001,718 | 3/1991 | Burrows et al. | 372/33 |
| 5,048,051 | 9/1991 | Zayhowski | 372/34 |
| 5,091,801 | 2/1992 | Ebstein | 359/665 |
| 5,099,355 | 3/1992 | Tomita | 359/246 |
| 5,132,980 | 7/1992 | Connors et al. | 372/33 |
| 5,329,539 | 7/1994 | Pearson et al. | 372/36 |

*Primary Examiner*—Léon Scott, Jr.
*Attorney, Agent, or Firm*—Hamilton, Brook, Smith & Reynolds

[57] ABSTRACT

An apparatus and method for controlling the propagation path of a light beam are disclosed. A lens material having a temperature-dependent index of refraction is positioned in the path of the light beam. A heat source is disposed on one face of the lens material and a heat sink is disposed on the opposite face. A controller regulates the distribution of heat to the heat source and the extraction of heat from the heat sink so that a temperature gradient is formed within the lens material. The temperature gradient creates a refractive-index gradient in the lens material, causing a thermal lensing effect. The device may be used in a laser cavity for controlling laser-beam divergence caused by pump-induced thermal lensing in the gain medium.

21 Claims, 5 Drawing Sheets

THERMALLY CONTROLLED LENSES FOR LASERS

GOVERNMENT SUPPORT

The Government has rights in this invention pursuant to Contract Number F 19628-90-C-0002, awarded by the United States Department of the Air Force.

BACKGROUND OF THE INVENTION

The proper operation of a laser requires that the divergence of the oscillating beam be within acceptable bounds at any given point within the laser cavity. If the beam divergence is outside of these bounds, the cavity becomes unstable and the performance of the laser is severely degraded.

In the process of pumping the gain medium of a laser, heat is generated. This heat results in a nonuniform temperature distribution within the gain medium and a phenomenon called thermal lensing occurs. Thermal lensing is an optical distortion caused by the combination of a nonuniform temperature distribution and a temperature dependent index of refraction, thermal expansion, or both. For many laser systems, the thermal lens in the gain medium is radially symmetric about the axis of the laser, and, to first order, acts as a parabolic lens. As the laser is pumped harder, the strength of the thermal lens increases, changing the divergences of the oscillating beam as it exits the gain medium. The laser cavity is therefore stable over a limited range of operating powers.

Various attempts have been made at solving the thermal-lensing problem. One solution involves a telescopic zoom lens comprising a pair of short focal length lenses of opposite optical power. This system compensates for the thermal lensing of the gain medium by mechanically adjusting the spacing between the lenses, maintaining the beam divergence within acceptable limits. The high cost and mechanical complexity of this system render this solution unattractive.

Another solution utilizes a compensator comprised of a cylindrically shaped body of optical material with a temperature-dependent index of refraction thermally coupled to a controlled heat source at the perimeter. When the temperature of the perimeter is changed, a transient nonuniform temperature distribution is induced within the compensator, resulting in a thermal lens which can be made to compensate for the pump-induced thermal lens in the laser gain medium. The problem with this system is that it relies on a nonequilibrium temperature distribution within the compensator material. When the temperature of the perimeter stops changing, the optical material eventually reaches thermal equilibrium, reducing or eliminating the corrective power of the compensator. The compensator must be cycled in temperature before the desired results can again be achieved.

SUMMARY OF THE INVENTION

The present invention is directed to an apparatus and method for compensating for laser beam divergence. The apparatus of the invention includes a thermal-lens material, a heat source, a heat sink, and a controller. The lens material has a temperature-dependent index of refraction, a temperature-dependent physical shape, or both. The heat source is in thermal contact with the lens material for imparting heat to the lens material. The heat sink is in thermal contact with the lens material for extracting heat from, or cooling, the lens material. The temperature differential between the heat source and heat sink creates a nonuniform temperature profile in the thermal-lens material. The controller monitors the distribution of heat to the heat source and the extraction of heat by the heat sink so that the temperature profile of the lens material produces the desired thermal lens, correcting the divergence of the incident light beam. Periodic cycling of the temperature of the lens material is not required because the controller maintains a constant temperature differential between the heat sink and the heat source. Therefore, the invention lends itself well to continuous use within a laser cavity for compensation of laser beam divergence. The temperature difference between the heat source and heat sink is maintained through the proper channeling of parasitic thermal energy from the laser or through heaters and coolers provided explicitly for that purpose. The lens faces may be flat and parallel in the absence of a temperature difference between the heat source and heat sink. If one face of the lens material is coated with a reflective material, the device operates as a mirror with a thermally controlled curvature. The lens material can also be the gain medium of a laser, for example, a monolithic solid-state laser.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
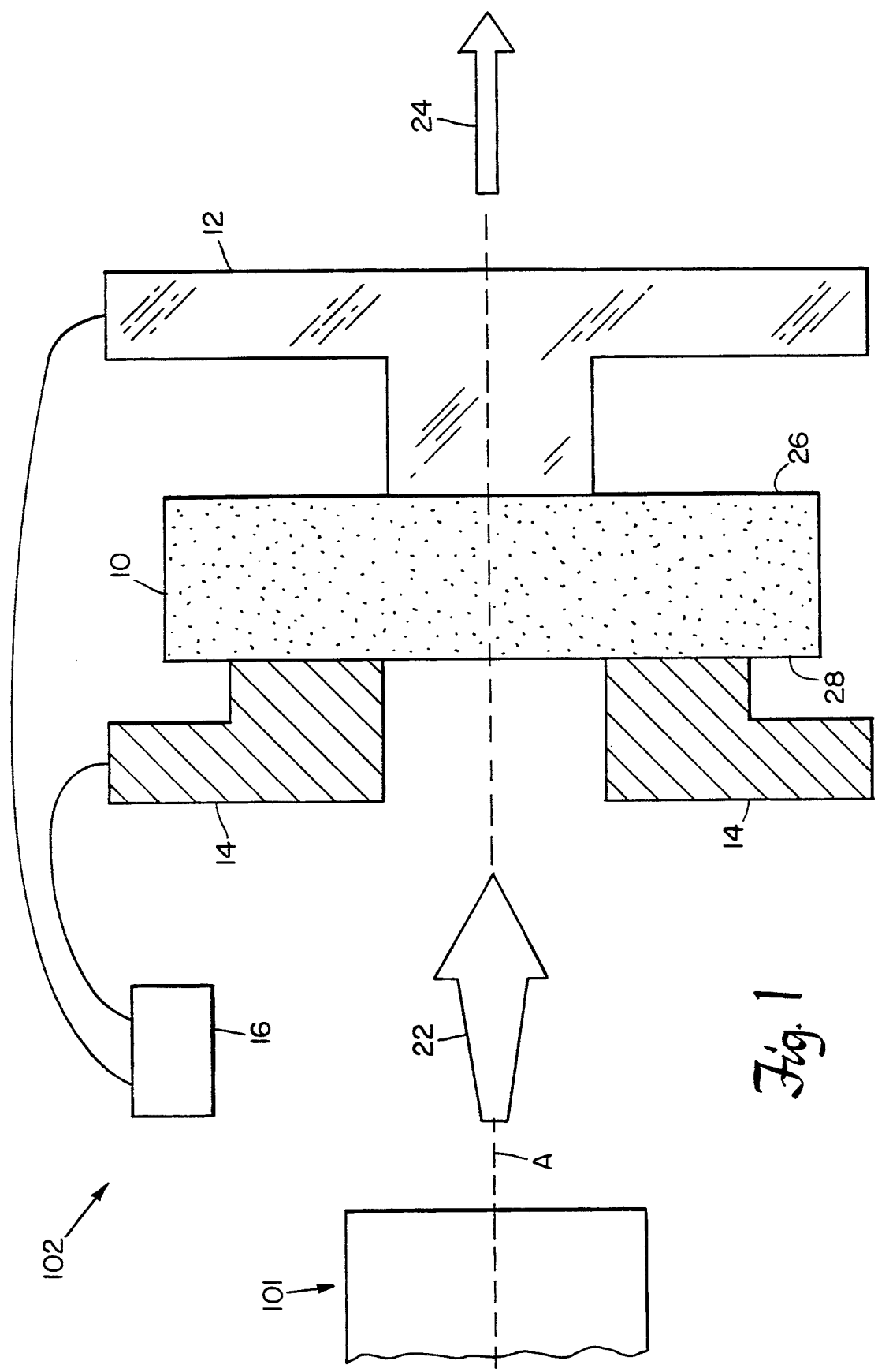
FIG. 1 is a cross-sectional view of a thermally controlled lens mounted outside a laser cavity for controlling the laser beam divergence, illustrating an embodiment of the present invention.

In FIG. 1, the apparatus of the present invention is applied as a variable focal-length lens 102 exterior to a solid-state laser system 101. A thermal-lens material 10 having a temperature-dependent index of refraction is polished flat and parallel on two opposite faces 28 and 26. The first face 28 is thermally coupled to a heat source 14 at an annular locus of points. The second face 26 is thermally coupled to a transparent heat sink 12 in a circular locus of points. A controller 16 maintains a temperature difference between the heat source 14 and heat sink 12. As a result, a radial temperature gradient is formed within the lens material 10, with the center of the lens being lower in temperature than the perimeter of the lens. Because the index of refraction of the lens material is dependent on temperature, a radial refractive-index gradient is created within the lens material 10. Thus, a lens is established within the material 10. With proper control, an incident divergent beam of light 22 is focused by the variable-focal-length lens 102 and emitted as a collimated beam of light 24, or alternatively, depending upon the behavior required, as a focused beam.

The lens material 10 can behave as a convex lens, having a positive power, or as a concave lens, having a negative power, depending on whether the temperature coefficient of the index of refraction dn/dT of the material is positive or negative. A medium with a positive temperature coefficient of the refractive index exhibits a higher refractive index when the temperature of the medium is increased, and a medium with a negative temperature coefficient of the refractive index exhibits a lower refractive index when the temperature of the medium is increased.

There are a number of methods for heating the heat source 14 and cooling the heat sink 12. In FIG. 1, the annular heat source 14 is comprised of an electrically resistive material. A voltage differential, regulated by the controller 16, is applied across the heat source 14, causing a current to flow through the electrically resistive material. The heat produced by the heat source 14 increases as the voltage increases. The cooling rate is again regulated by the controller 16. One method of cooling comprises a thermal-electric cooler. Other methods of heating and cooling are available and are discussed below in conjunction with alternate embodiments of the invention.

Figure 2:
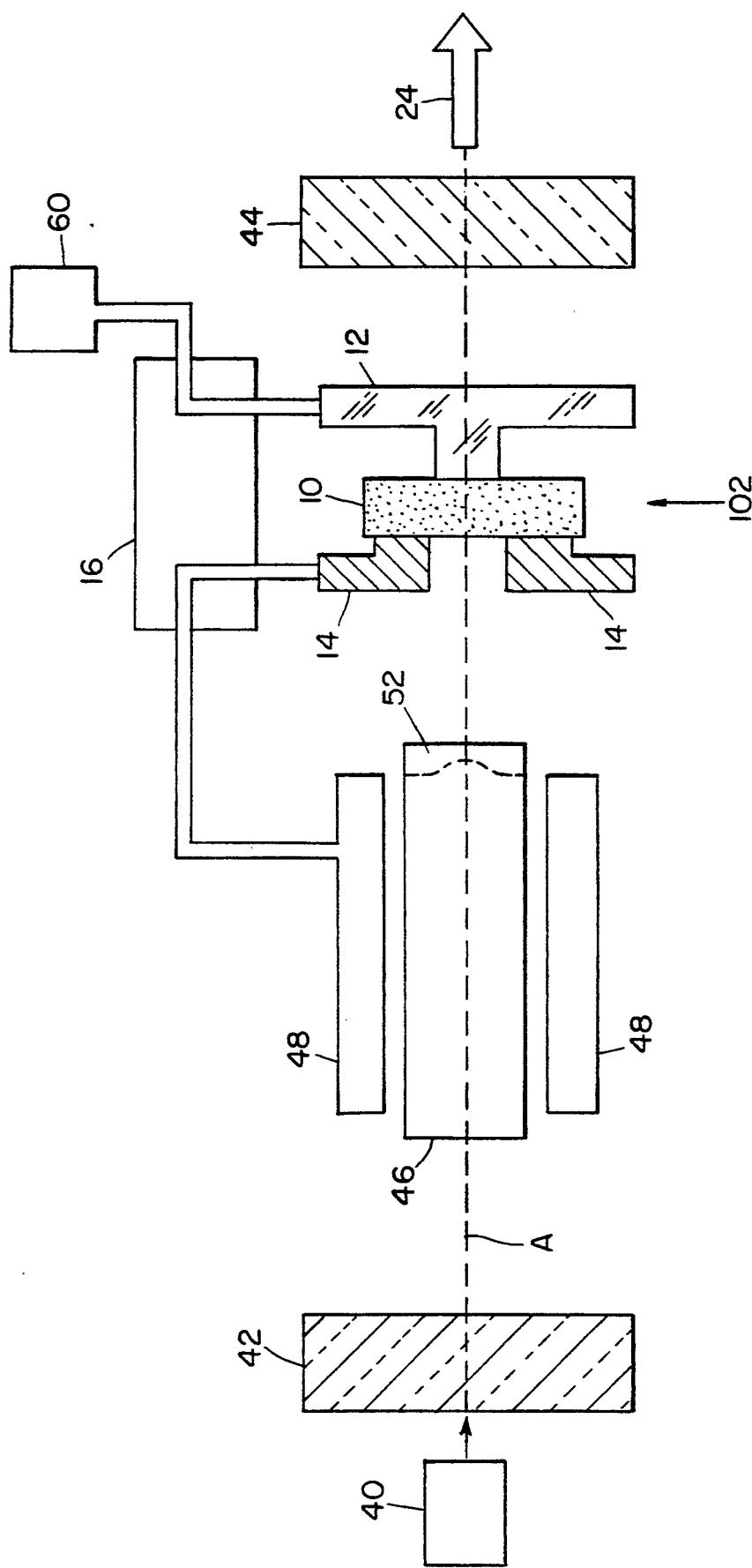
FIG. 2 is a cross-sectional view of a thermally controlled lens mounted inside a laser cavity for compensating for laser beam divergence, illustrating a preferred embodiment of the present invention.

In FIG. 2 the compensator 102 is disposed within the laser cavity for correcting the divergence of the laser beam. A resonant cavity is formed between the entrance mirror 42 and the exit mirror 44. A laser gain medium 46, disposed along the optical axis A, is pumped by pump 40, producing a beam which resonates along the axis A. The beam divergence is dependent on the pump-induced thermal lensing 52 in the gain medium 46, caused by a difference in temperature between the center of the gain medium, along the optical axis A, and the perimeter of the gain medium, bounded by the gain-medium heat sink 48. The controller 16 senses the extent of the divergence of the beam and produces a temperature gradient in the thermal-lens material 10 by inducing a temperature difference between the heat source 14 and the heat sink 12. The temperature gradient creates a refractive-index gradient which corrects the divergence of the beam, and a coherent beam 24 is emitted.

In this embodiment, an alternate method for heating and cooling the lens material is illustrated. Parasitic heat is extracted from the gain-medium heat sink 48 and channeled, by the controller 16, over to the compensator heat source 14 for imparting heat to the thermal-lens material 10. The heat source 14, in this case, is comprised of a thermally conductive material such as diamond, sapphire, YAG, or copper. The heat sink 12, likewise comprises a thermally conductive material, but, since it is in the optical path A, a transparent material such as sapphire or YAG is preferred. The thermally conductive material may be liquid-cooled as shown in FIG. 2, with the controller 16 regulating the amount of, or temperature of, the coolant. The coolant is stored in a refrigerated reservoir 60 and, when needed, is withdrawn by the controller 16 and imparted on the heat sink 12. The warmed liquid is then recirculated and pumped back to the reservoir 60 for refrigeration. Pumped air may also be used to cool the heat sink. The pumped-air method may be improved by attaching fins to the heat sink 12 or by forming fins in the heat-sink material.

Figure 3:
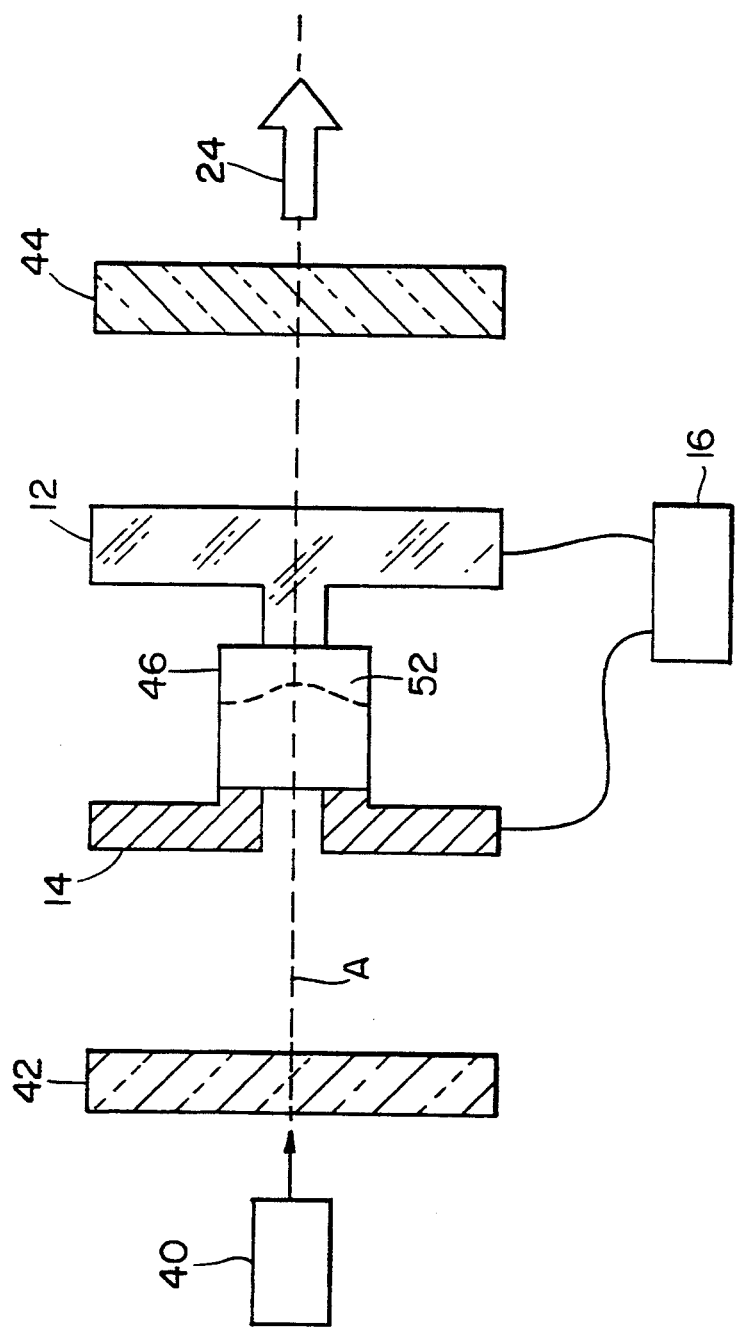
FIG. 3 is a cross-sectional view of an alternate embodiment of the present invention using the gain medium as a thermal-lens material for compensation of pump-induced thermal lensing.

FIG. 3 demonstrates how the laser gain medium 46 can also be the thermal-lens material for the purpose of this invention. The laser gain medium 46, disposed along the optical axis A, is pumped by pump 40, producing a resonant beam of light inside the cavity formed between the entrance mirror 42 and exit mirror 44. The center of the gain medium 46, along optical axis A, is normally hotter than the perimeter of the gain medium, which is normally cooled. This causes a pump-induced thermal lensing effect 52 within the gain medium 46.

In this embodiment, the heat sink 12 is thermally connected to the gain medium 46 in a circular locus of points on the face of the gain medium 46, centered on the optical axis A. The heat source 14 is thermally connected to the opposite face of the gain medium 46 in an annular locus of points. The controller 16 induces a temperature differential between the heat sink 12 and heat source 14 in such a way that the pump-induced thermal lensing effect 52 in the gain medium 46 is offset by the refractive index gradients induced by the controller 16.

Figure 4:
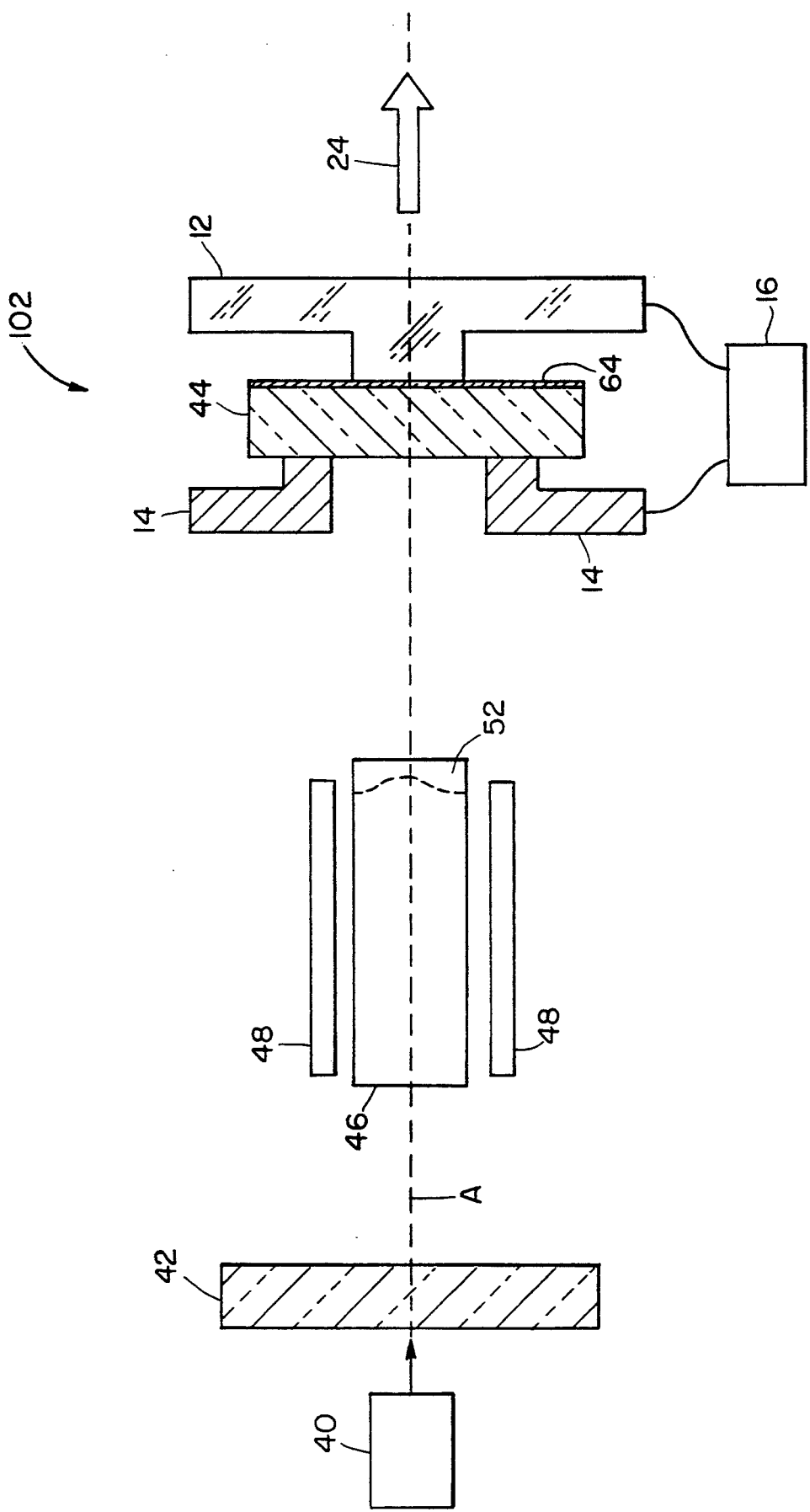
FIG. 4 is a cross-sectional view of an alternate embodiment of the present invention, which compensates for laser beam divergence by using a cavity mirror as the thermal-lens material.

FIG. 4 illustrates an embodiment of the invention wherein the exit mirror 44 of the laser cavity is used as a thermal-lens compensator 102. Again, a pump-induced thermal gradient in the gain medium 46 produces a thermal lensing effect 52, changing the divergence of the laser beam. The mirror 44 is comprised of a thermal-lens material, one face of which is coated with a reflective material 64. The heat sink 12 is disposed along the optical axis A of the cavity and is thermally coupled to the mirror 44 in a circular locus of points. The heat source 14 is disposed in an annular locus of points on the face of the mirror 44 opposite the heat sink 12 and is thermally coupled to the mirror 44. The controller 16 again senses the laser beam divergence and compensates by inducing a temperature differential between the heat source 14 and the heat sink 12. With proper control, a coherent beam 24 is emitted.

Figure 5:
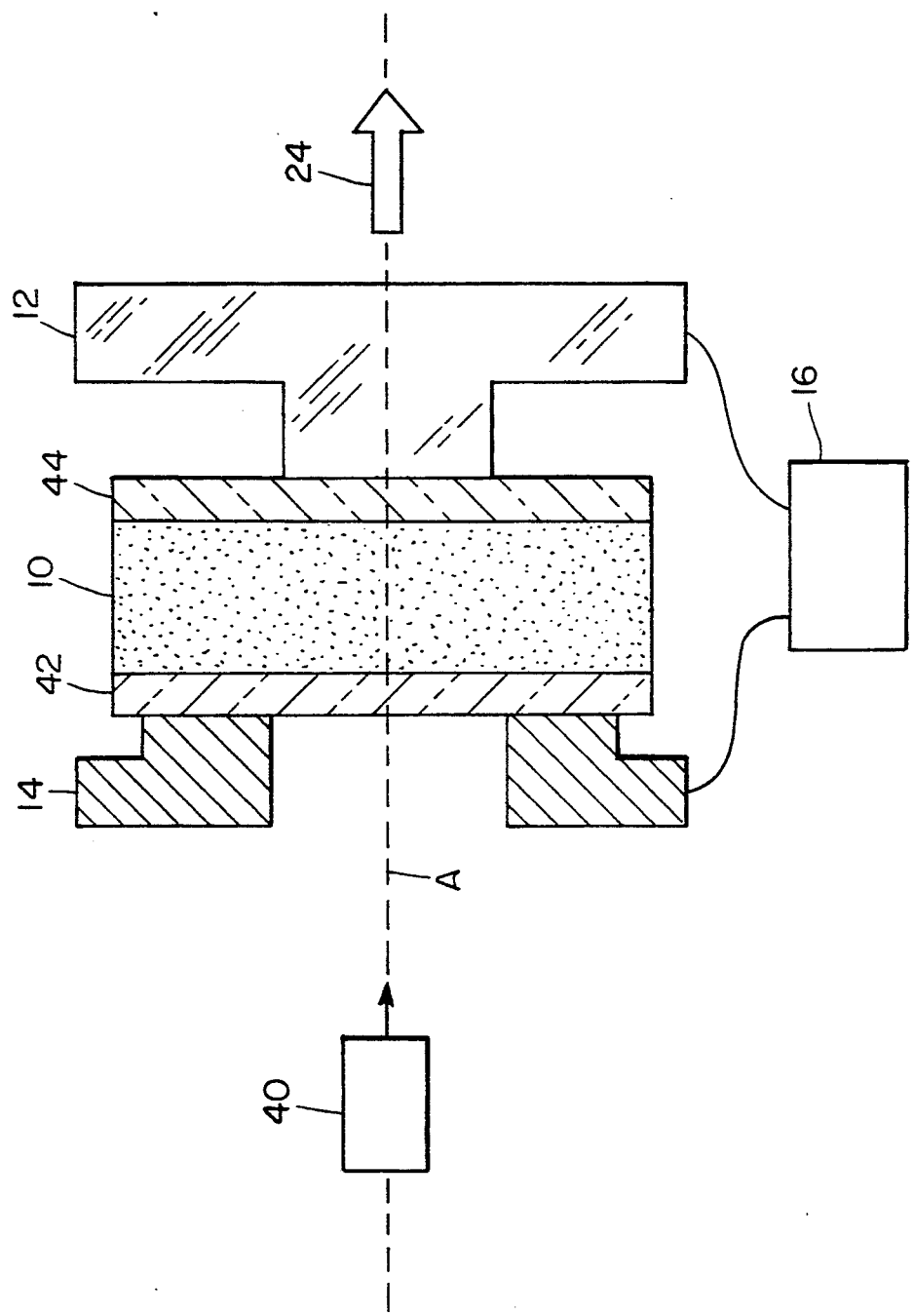
FIG. 5 is a cross-sectional illustration of an alternate embodiment of the present invention, which compensates for pump-induced thermal lensing in a monolithic laser.

FIG. 5 illustrates an embodiment of the present invention wherein the thermal lens material comprises the gain medium 10 of a monolithic laser cavity formed between an entrance mirror 42 and exit mirror 44. The gain medium is pumped by pump 40, producing a resonant beam of light along the optical axis A of the cavity. A heat sink 12 is disposed along the optical axis A of the cavity adjacent exit mirror 44 and is thermally coupled to the exit mirror 44 in a circular locus of points. A heat source 14 is disposed adjacent the entrance mirror 42 and is thermally coupled to the entrance mirror 42 in an annular locus of points. The controller 16 senses the divergence of the emitted beam and induces a temperature differential between the heat source 14 and heat sink 12 to compensate for the pump-induced thermal lensing in the gain medium 10.

A compensator which is more conducive to manufacturing includes a heat sink which is coupled to an entire face of the thermal-lens material, rather than in a circular locus of points centered on the optical axis. In this embodiment, alignment of the heat sink with the thermal-lens material is easier. However, the strength of the thermal lensing is not as great for a given temperature difference between the heat source and heat sink.

The invention may also compensate for mirror misalignment in a laser cavity. In this case, the heat source and heat sink may be disposed on the same face of the thermal-lens material, producing a linear thermal gradient along the thermal-lens material, between the source and sink, which acts as a thermally controlled prism.

A more complicated thermal profile may be induced in the lens material by strategic placement of the heat source and heat sink. More than one heat source and sink may be positioned across the lens material, so as to produce the desired refractive-index profile.

The invention described above has application in compensating for thermally-induced birefringence of the gain medium. The lens material with the appropriate thermally-induced birefringence is heated and cooled as discussed above to produce the desired compensating effects.

In any of the above embodiments, the heat source and heat sink may be exchanged so that the heat source is in thermal contact with the thermal-lens material in a circular locus of points centered on the optic axis and the heat sink is in thermal contact in an annular locus of points. Exchanging the heat source and heat sink reverses the sign of the thermal lens produced by the invention. Another way to reverse the sign of the thermal lens is to use a lens material with the opposite temperature coefficient of refractive index.

While this invention has been particularly shown and described with references to preferred embodiments thereof, it will be understood by those skilled in the art that various changes in form and detail may be made therein without departing from the spirit and scope of the invention as defined by the appended claims.

I claim:

1. An optical device comprising:
   a) a lens material with two opposed faces for controlling the propagation of a beam of light in a predetermined path which is primarily dependent upon the shape and refractive index of the body, and having a shape or refractive index which is thermally sensitive;
   b) a heat source for heating said lens material;
   c) a heat sink for cooling said lens material; and
   d) a controller for controlling said heat source and said heat sink so that the resultant propagation path of said light beam is controlled by the difference in temperature between said heat source and heat sink.

2. The device of claim 1 wherein said opposed faces are flat and parallel in the absence of a temperature difference between said heat source and heat sink.

3. The device of claim 1 wherein one of said faces of said lens material is reflective such that said optical device operates as a mirror with a thermally controlled surface.

4. The device of claim 1 wherein said lens material comprises a gain medium of a laser.

5. The device of claim 4 wherein said laser is a solid-state laser.

6. A thermally controlled lens comprising:
   a) a thermal lens comprised of a material the shape or refractive index of which is thermally controllable;
   b) at least one heat source in thermal contact with said thermal lens at a locus of points; and
   c) at least one heat sink in thermal contact with said thermal lens at a locus of points, such that the shape or refractive index of said thermal lens is controlled by the temperature difference between said heat sources and heat sinks.

7. The device of claim 6 wherein the two faces of said thermal lens in contact with said at least one heat source and said at least one heat sink are flat and parallel in the absence of a temperature difference between said at least one heat source and said at least one heat sink.

8. The device of claim 6 wherein one of the surfaces of said thermal lens material is reflective such that the device operates as a mirror with a thermally controlled curvature.

9. An optical device comprising:
   a) a first optical medium having a first shape or index of refraction which varies with temperature;
   b) a light beam for propagation through said first optical medium;
   c) an energy source which deposits thermal energy in said first optical medium thereby providing a first temperature gradient in said first optical medium which changes the path of propagation of said light beam through said first optical medium;
   d) a second optical medium in the path of said light beam having a second shape or index of refraction which varies with temperature;
   e) a heat source for heating said second optical medium; and
   f) a heat sink for cooling said second optical medium; said heat source and said heat sink creating a second temperature gradient in said second optical medium which compensates for the change in the path of said light beam through said first medium.

10. The device of claim 9 wherein said heat source is provided heat from parasitic thermal energy from said first optical medium.

11. The device of claim 9 wherein said first optical medium is a laser gain medium.

12. A system comprising:
   a) a laser cavity formed by a first mirror and a second mirror;
   b) a gain medium disposed between said mirrors;
   c) a source for pumping said gain medium with energy for causing laser gain within said laser cavity, producing a laser beam;
   d) an optical medium disposed within said cavity along the path of said laser beam having a temperature-dependent shape or index of refraction;
   e) a heat source for heating said optical medium;
   f) a heat sink for cooling said optical medium; and
   g) a controller for controlling said heat source and heat sink such that a temperature gradient is formed within said optical medium; said temperature gradient causing a refractive index gradient within said optical medium, or nonuniform thermal expansion of said optical medium, for controlling the propagation path of said laser beam.

13. The system of claim 12 wherein said heat source is provided heat from parasitic thermal energy from said gain medium.

14. A system comprising:
   a) a laser cavity formed by a first mirror and a second mirror;
   b) a gain medium disposed between said mirrors;
   c) a source for pumping said gain medium with energy for causing laser gain within said laser cavity, producing a laser beam;

d) a heat source for heating said gain medium;

e) a heat sink for cooling said gain medium; and f) a controller for controlling said heat source and said heat sink such that a temperature gradient is formed within said gain medium, said temperature gradient causing a refractive-index gradient within said gain medium, for controlling the propagation path of said laser beam.

15. A method for controlling the propagation path of a light beam incident on an optical device having a temperature-dependent shape or index of refraction, comprising the steps of:

a) heating said optical device;

b) cooling said optical device; and c) controlling the rate of heating and cooling of said optical device to maintain an equilibrium temperature gradient across said optical device to control the propagation path of said incident light beam.

16. The method of claim 15 further comprising the step of forming a reflective surface on said optical device such that said optical device operates as a mirror with a thermally controlled surface.

17. A method for thermally controlling the properties of a lens, said lens having a temperature-dependent shape or index of refraction, comprising the steps of:

a) heating the lens at a locus of points;

b) cooling the lens at a locus of points; and c) controlling the rate of heating and cooling of the lens to maintain an equilibrium temperature gradient across the lens; said temperature gradient controlling the shape or refractive index of the lens.

18. The method of claim 17 further comprising the step of forming a reflective surface on one of the lens faces such that the device operates as a mirror with a thermally controlled curvature.

19. A method for directing the propagation of a light beam comprising the steps of:

a) pumping a gain medium, disposed in a cavity formed by two mirrors, with energy for producing a laser output beam;

b) disposing an optical medium in the path of said laser beam, said optical medium having a temperature-dependent shape or index of refraction;

c) heating said optical medium;

d) cooling said optical medium; and e) controlling the heating and cooling of said optical medium to produce an equilibrium refractive index gradient within said optical medium, or a nonuniform thermal expansion of said optical medium, for directing the propagation of said laser beam.

20. The method of claim 19 wherein the step of heating said optical medium is accomplished with heat provided by parasitic thermal energy from said gain medium.

21. A method for directing the propagation of a light beam comprising the steps of:

a) pumping a gain medium, disposed in a cavity formed by two mirrors, with energy for producing a laser beam;

b) heating said gain medium;

c) cooling said gain medium; and d) controlling the heating and cooling to produce an equilibrium refractive index gradient within said gain medium, or a nonuniform thermal expansion of said gain medium, for directing the propagation of said laser beam.

* * * * *